United States Patent
Plumer et al.

(10) Patent No.: US 7,100,266 B2
(45) Date of Patent: Sep. 5, 2006

(54) METHOD OF FORMING A BEVELED WRITING POLE OF A PERPENDICULAR WRITING ELEMENT

(75) Inventors: Martin L. Plumer, Bloomington, MN (US); Nurul Amin, St. Paul, MN (US); Vee S. Kong, Richfield, MN (US); Richard P. Michel, Minneapolis, MN (US); Johannes van Ek, Minnetonka, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 402 days.

(21) Appl. No.: 10/039,201

(22) Filed: Jan. 4, 2002

(65) Prior Publication Data

US 2002/0170165 A1 Nov. 21, 2002

Related U.S. Application Data

(60) Provisional application No. 60/291,439, filed on May 16, 2001.

(51) Int. Cl.
G11B 5/127 (2006.01)
H04R 31/00 (2006.01)

(52) U.S. Cl. .............. 29/603.14; 29/603.07; 29/603.13; 29/603.15; 29/603.16; 29/603.18; 360/122; 360/123; 360/126; 360/317; 216/65; 427/127; 427/128; 451/5; 451/41

(58) Field of Classification Search .......... 29/603.07, 29/603.12–603.16, 603.18; 360/122–126, 360/31; 216/65; 451/5, 41
See application file for complete search history.

(56) References Cited

U.S. PATENT DOCUMENTS

| 4,190,872 | A | * | 2/1980 | Jones et al. | 360/125 |
| 4,390,916 | A | | 6/1983 | Chow et al. | 360/127 |
| 4,550,353 | A | * | 10/1985 | Hirai et al. | 360/125 |
| 4,764,833 | A | | 8/1988 | Imamura et al. | 360/126 |
| 4,771,350 | A | | 9/1988 | Desserre | 360/123 |
| 4,811,142 | A | | 3/1989 | Nakashima et al. | 360/103 |
| 4,839,761 | A | | 6/1989 | Gatzen | 360/103 |
| 4,912,584 | A | * | 3/1990 | Mallary et al. | 360/126 |
| 4,974,110 | A | | 11/1990 | Kanamine et al. | 360/126 |
| 4,982,301 | A | | 1/1991 | Endo | 360/125 |
| 5,073,836 | A | | 12/1991 | Gill et al. | 360/113 |
| 5,075,956 | A | * | 12/1991 | Das | 29/603.14 |

(Continued)

FOREIGN PATENT DOCUMENTS

JP 07296331 A * 11/1995

OTHER PUBLICATIONS

"Edge effects in narrow track recording using symmetric and asymmetric write pole geometries"; Wu, E.Y.; Peske, J.V.; Magnetics, IEEE Transactions on , vol. 30 , Issue: 6 , Nov. 1994; pp. 4254-4256.*

*Primary Examiner*—Paul D. Kim
(74) *Attorney, Agent, or Firm*—Westman, Champlin & Kelly (57) ABSTRACT

A beveled writing pole includes a top portion, a beveled portion, and a throat portion. The top portion has an end that defines a writing pole tip. The beveled portion adjoins the top portion and has a bevel that extends from the writing pole tip and increases a thickness of the writing pole proximate the pole tip. The throat portion is formed of the top and beveled portions and has tapered sides that extend from the writing pole tip and increase a width of the writing pole proximate the writing pole tip. A method of forming the beveled writing pole is also presented.

31 Claims, 7 Drawing Sheets

U.S. PATENT DOCUMENTS

| | | | |
|---|---|---|---|
| 5,196,976 A | 3/1993 | Lazzari | 360/113 |
| 5,225,953 A | 7/1993 | Wada et al. | 360/126 |
| 5,680,283 A | 10/1997 | Tanaka et al. | 360/125 |
| 5,726,841 A | 3/1998 | Tong et al. | 360/122 |
| 5,854,727 A | 12/1998 | Tanaka et al. | 360/125 |
| 5,995,341 A | 11/1999 | Tanaka et al. | 360/125 |
| 6,504,675 B1 | 1/2003 | Shukh et al. | 360/125 |
| 6,510,022 B1 * | 1/2003 | Lahiri et al. | 360/126 |
| 6,710,973 B1 | 3/2004 | Okada et al. | 360/125 |
| 2002/0034043 A1 | 3/2002 | Okada et al. | 360/125 |

* cited by examiner

METHOD OF FORMING A BEVELED WRITING POLE OF A PERPENDICULAR WRITING ELEMENT

CROSS-REFERENCE TO RELATED APPLICATION

The present invention claims priority from U.S. Provisional Application 60/291,439 filed on May 16, 2001 for inventors Martin L. Plumer; Nurul Amin; Vee S. Kong; Richard P. Michel; and Johannes van Ek entitled "THIN WRITE HEAD BEVELED AT THE AIR BEARING SURFACE FOR PERPENDICULAR RECORDING."

FIELD OF THE INVENTION

The present invention relates generally to disc drive storage systems. More particularly, but not by limitation, the present invention relates to a beveled writing pole of a perpendicular writing element and a method of forming the beveled writing pole.

BACKGROUND OF THE INVENTION

Disc drives are the primary devices employed for mass storage of computer programs and data. Disc drives typically use rigid discs, which are coated with a magnetizable medium to form a recording layer in which data can be stored in a plurality of circular, concentric data tracks. Typical read/write heads include separate read and write head portions. One advantage to this configuration is that the read and write heads can be optimized for the particular task they are to perform.

The read head typically includes a magnetoresistive or a giant magnetoresistive read element that is adapted to read magnetic flux transitions recorded to the tracks which represent the bits of data. The magnetic flux from the disc surface causes a change in the electrical resistivity of the read element, which can be detected by passing a sense current through the read element and measuring a voltage across the read element. The voltage measurement can then be decoded to determine the recorded data.

The write head includes an inductive writing element for generating a magnetic field that aligns the magnetic moments of the recording layer to represent the desired bits of data. Magnetic recording techniques include both longitudinal and perpendicular recording. Perpendicular recording is a form of magnetic recording in which magnetic moments representing bits of data are oriented perpendicularly to the surface of the recording layer of the recording medium, as opposed to longitudinally along a track of the medium as in the more traditional longitudinal recording technique. Perpendicular recording offers advantages over longitudinal recording, such as significantly higher areal density recording capability. The areal density is generally defined as the number of bits per unit length along a track (linear density in units of bits per inch) multiplied by the number of tracks available per unit length in the radial direction of the disc (track density in units of track per inch or TPI).

Several characteristics of the perpendicular writing element play an important role in determining its areal density recording capability. One important characteristic, is that the writing element must be capable of operating with a recording medium whose recording layer has a high coercivity. The coercivity of the recording layer relates to the magnitude of the magnetic field that must be applied in order to control the orientation of the magnetic moments of the recording layer. A high coercivity leads to high thermal stability and suppresses the effects of demagnetizing fields to allow for higher areal density recordings.

Other important characteristics of the writing element relate to the track width within which the writing element can write bits of data and the linear density at which the writing element can write bits of data along a given track. The track width of the writing element is generally determined by a width of the pole tip of the writing pole. The linear density of a perpendicular writing element is determined, in part, by the thickness or height of the pole tip. In general, the thinner the pole tip, the greater the linear density that can be achieved. The reduction in the thickness of the pole tip also desirably reduces the likelihood of "side writing" where the writing element overwrites data recorded in adjacent tracks when operating at large skew angles. Unfortunately, for conventional writing poles, there are limitations to the amount that the thickness of the pole tip can be reduced.

Typical writing poles have a substantially uniform thickness to the pole tip. Therefore, a reduction to the thickness of the pole tip results in a reduction to the remainder of the writing pole that is adjacent the pole tip. This reduction in thickness diminishes the magnitude of the magnetic field that can be conducted through the writing pole tip and, thus, limits the coercivity of the recording medium on which the writing element can effectively record data. Consequently, such a reduction to the thickness of the writing pole reduces its ability to record data at a high areal density.

A possible alternative to the writing pole having a uniform thickness, is to bevel the writing pole at the pole tip. This configuration allows the majority of the writing pole to have a large thickness while providing the desirable thin pole tip. Computer simulations have indicated that the magnetic field intensity at the pole tip for such a design is substantially increased over writing poles having a uniform thickness. Accordingly, such a beveled writing pole design should have the capability of performing high areal density recordings since it can operate with recording media having a high coercivity. Unfortunately, methods of manufacturing such a beveled writing pole have yet to be developed.

Therefore, a need exists for methods of manufacturing a beveled writing pole of a perpendicular writing element for use in a disc drive storage system.

SUMMARY OF THE INVENTION

The present invention is directed to a beveled writing pole of a perpendicular writing element and a method of forming the same. The beveled writing pole includes a top portion, a beveled portion, and a throat portion. The top portion has an end that defines a writing pole tip. The beveled portion adjoins the top portion and has a bevel that extends from the writing pole tip and increases a thickness of the writing pole proximate the pole tip. The throat portion is formed of the top and beveled portions and has tapered sides that extend from the writing pole tip and increase a width of the writing pole proximate the writing pole tip.

In a first step of the method, a ramped step is formed having a high side, a low side, and a ramp portion connecting the high side to the low side. Next, a writing pole portion is formed on the ramped step. The writing pole portion includes a top portion overlaying a beveled portion. Finally, a pole tip of the top portion is defined. The pole tip includes an air bearing surface and a thickness, which substantially corresponds to a thickness of the top portion.

Other features and benefits that characterize embodiments of the present invention will be apparent upon reading the following detailed description and review of the associated drawings.

BRIEF DESCRIPTION OF THE DRAWINGS

FIGS. 9.1–9.3 are partial side cross-sectional views illustrating a steps of forming a vertical step in accordance with an embodiment of the invention.

FIGS. 10.1–10.3 are partial side cross-sectional views illustrating steps of forming a vertical step in accordance with an embodiment of the invention.

FIGS. 11.1–11.5 are partial side cross-sectional views illustrating steps of forming a beveled writing pole in accordance with various embodiments of the invention.

DETAILED DESCRIPTION OF ILLUSTRATIVE EMBODIMENTS

Figure 1:
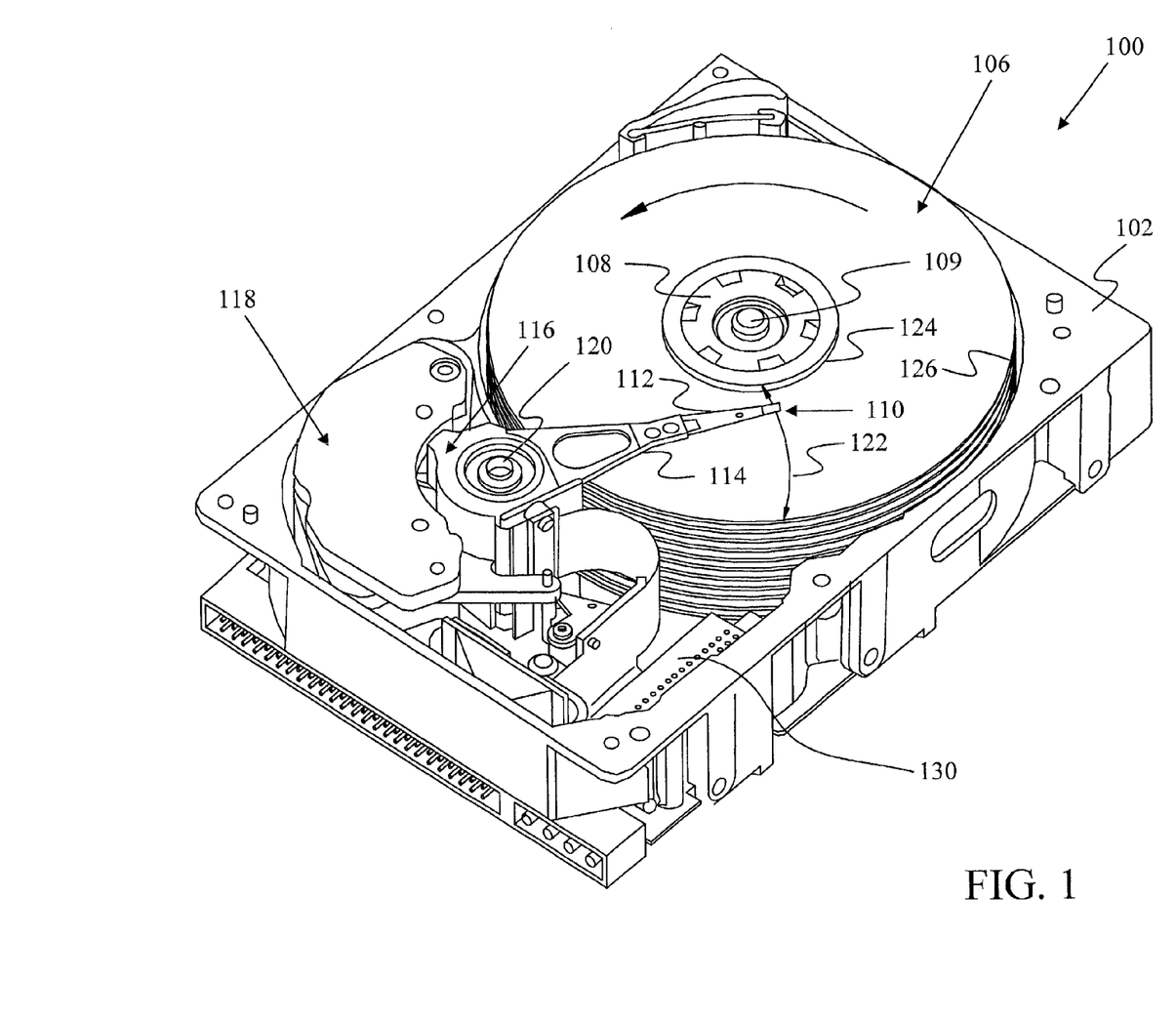
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
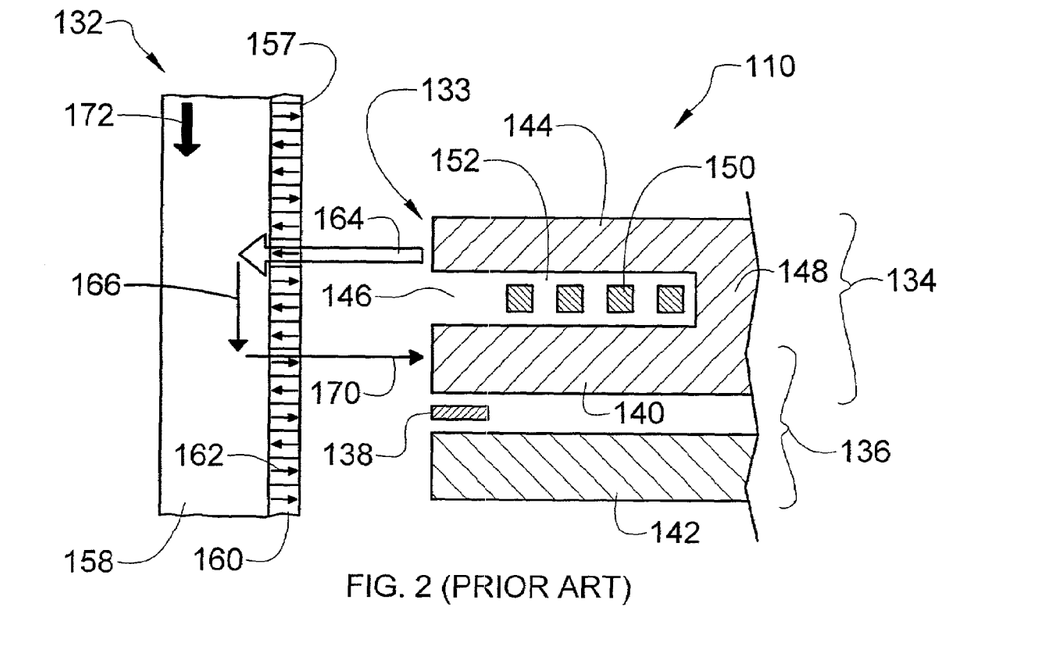
FIG. 2 is a cross-sectional view of a read/write head in accordance with the prior art.
Figure 3:
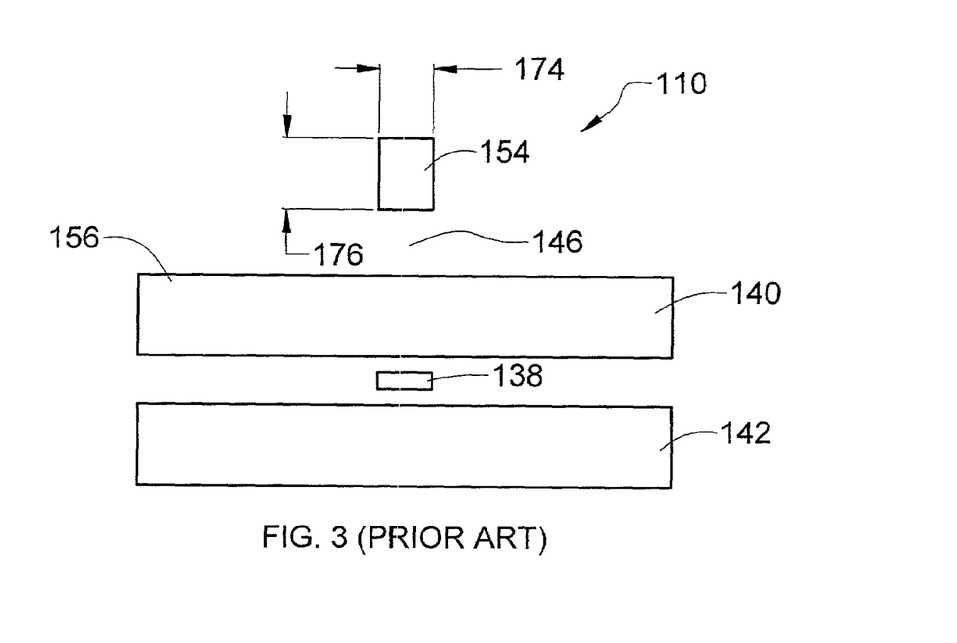
FIG. 3 is a simplified layered diagram of the prior art read/write head of FIG. 2 as viewed from the recording medium.

A side cross-sectional view of a read/write head 110 in accordance with the prior art as shown in FIG. 2. FIG. 3 is a simplified layered diagram of the read/write head 110 of FIG. 2 as viewed from a disc 132 and illustrates the location of a plurality of significant elements as they appear along an air bearing surface (ABS) 133 of head 110. In FIG. 3, all spacing and insulating layers are admitted for clarity. Read/ write head 110 includes a perpendicular writing element 134 and a reading element 136. Reading element 136 of head 110 includes a read sensor 138 that is spaced between a return pole 140, which operates as a top shield, and a bottom shield 142. The top and bottom shields operate to isolate the reading element from external magnetic fields that could affect its sensing bits of data that have been recorded on disc 132.

Writing element 134 includes a main or writing pole 144 and the return pole 140. The writing and return poles 144 and 140 are separated by a writer gap 146. Writing pole 144 and return pole 140 are connected at a back gap "via" 148. A conductive coil 150 extends between writing pole 144 and return pole 140 and around back gap 148. An insulating material 152 electrically insulates conductive coil 150 from writing and return poles 144 and 140. Writing and return poles 144 and 140 include writing and return pole tips 154 and 156, respectively, which face disc surface 157 and form a portion of the ABS 133 of disc head slider 110.

A magnetic circuit is formed in writing element 134 by writing and return poles 144 and 140, back gap 148, and a soft magnetic layer 158 of disc 102, which underlays a hard magnetic or recording layer 160. Recording layer 160 includes vertical magnetic moments 162, each of which represent a bit of data in accordance with their up or down orientation. In operation, an electrical current is caused to flow in conductor coil 150, which induces a magnetic field that is conducted through the magnetic circuit. The magnetic circuit causes the magnetic field to travel vertically through the writing pole tip 154 and recording layer 160 of the recording medium as indicated by arrow 164.

Next, the magnetic field is directed horizontally through soft magnetic layer 158 of the recording medium, as indicated by arrow 166, and then vertically back through recording layer 160 through return pole tip 156 of return pole 140, as indicated by arrow 170. Finally, the magnetic field is conducted back to writing pole 144 through back gap 148.

Writing pole tip 154 is shaped to concentrate the magnetic field travelling therethrough to such an extent that the orientation of magnetic moments 162 of recording layer 160 are forced into alignment with the magnetic field and, thus, cause bits of data to be recorded therein. In general, the magnetic field through recording layer 160 at writing pole tip 154 must be twice the coercivity or saturation field of that layer. Head 110 travels in the direction indicated by arrow 172 (FIG. 2) relative to disc 132 thereby positioning writing pole 144 downstream of return pole 140 relative to disc 132.

The areal density at which perpendicular writing element 134 is capable of recording data to recording layer 160 of disc 132 depends, in part, on a width 174 and a height or thickness 176 of the writing pole tip 154, as shown in FIG. 3. Width 174 effects the track width within which writing element 134 can write bits of data and the thickness 176 effects the linear density at which writing element 134 can write bits of data along a given track. Additionally, since it is necessary to utilize a recording layer 160 having a high coercivity for high areal density recordings, writing pole 144 must be capable of conducting a strong magnetic field through the pole tip 154, such that the coercivity of the recording layer 160 can be substantially exceeded to write data thereto. Although prior art perpendicular writing elements 134 include a narrow pole tip 154, the thickness 176 of the pole tip 154 has remained large to ensure that the required high magnetic field can be conducted therethrough. As a result, these prior art designs have been limited in their areal density recording capabilities. Furthermore, the large thickness 176 of these prior art writing elements 134 increases side writing problems at large skew angles, which further limits the areal density at which they are capable of recording data.

Figure 4:
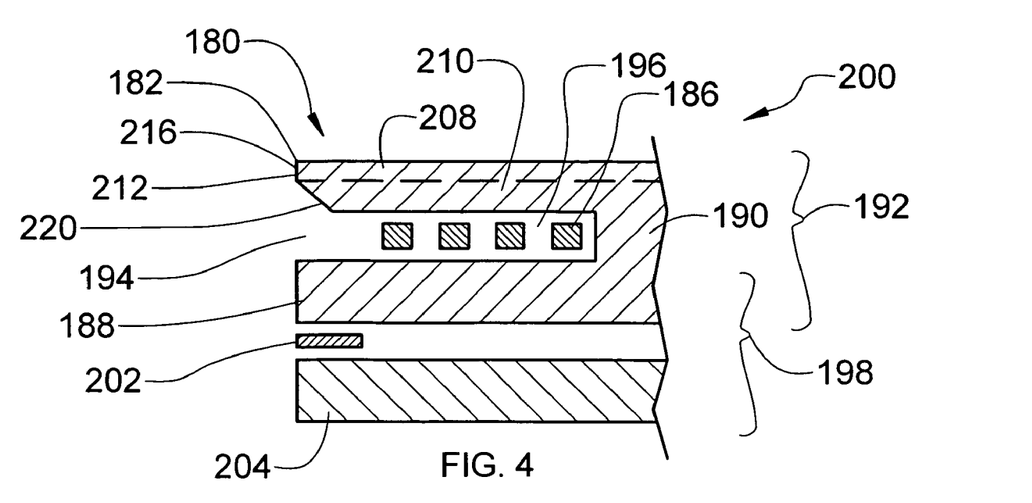
FIG. 4 is a cross-sectional view of a read/write head in accordance with an embodiment of the present invention.
Figure 5:
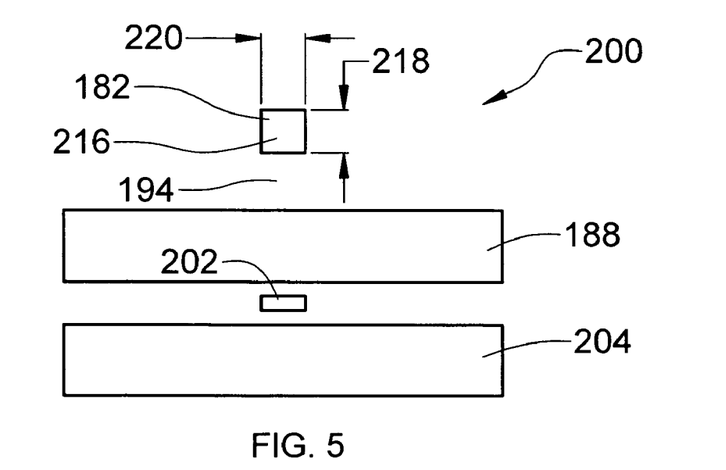
FIG. 5 is a simplified layered diagram of the read/write head of FIG. 4 as viewed from the recording medium.
Figure 6:
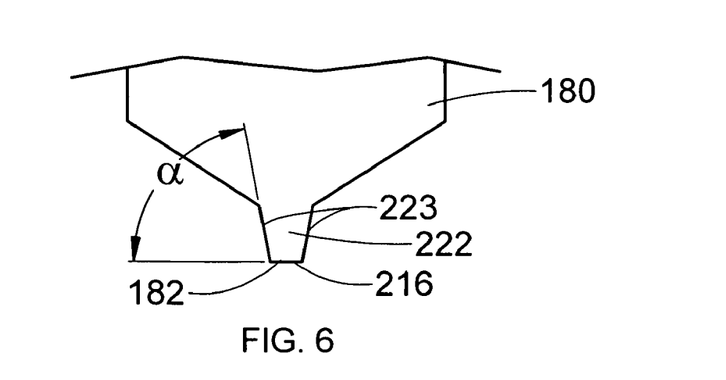
FIG. 6 is a top view of the read/write head of FIG. 4 in accordance with an embodiment of the invention.

The present invention is directed to a beveled writing pole 180, shown in FIGS. 4–6, having a pole tip 182 that can be formed thinner than conventional prior art recording layers (such as 144 of FIG. 2) while maintaining an ability to conduct a strong magnetic field therethrough. Beveled writing pole 180 can be combined with conventional components, such as a conducting coil 186, a return pole 188 connected to beveled writing pole 180 at a back gap 190 to form a perpendicular writing element 192 having an areal density recording capability beyond that attainable by conventional writing elements of the prior art, such as writing element 134 of FIGS. 2 and 3. Beveled writing pole 180 and return pole 188 are separated by writer gap 194 and an insulating material 196 insulates the writing and return poles 180 and 188 from conductive coils 186. Additionally, a conventional read element 198 can be incorporated to form a read/write head 200. Read element 198 includes a read sensor 202 sandwiched between a bottom shield 204 and return pole 188 which operates as a top shield.

Beveled writing pole 180 includes a top portion 208 overlaying a beveled portion 210. The dashed line of FIG. 4 indicates the boundary between top portion 208 and beveled portion 210. An end 212 of top portion 208 forms writing pole tip 182 and has an air bearing surface (ABS) 216. A thickness 218 (FIG. 5) of writing pole tip 182 is preferably similar to, or less than, its width 220 (FIG. 6) to form a substantially square ABS 216. Height or thickness 218 and width 220 are preferably 200 angstroms or less. In addition to allowing for high linear density recording of data, the small square surface area of pole tip 182 reduces side writing problems even at large skew angles.

Beveled portion 210 allows a large amount of magnetic material to be maintained in close proximity to pole tip 182. Beveled portion 210 includes a bevel 220 that extends from pole tip 182 toward back gap 190. The angle of bevel 220 relative to ABS 216 is preferably in the range of forty-five degrees. This configuration allows a strong magnetic field to be conducted through pole tip 182, even with its short height 218, resulting in a higher areal density recording capability than that attainable by conventional prior art writing elements, such as 134 shown in FIG. 2.

To further increase the amount of magnetic material that is positioned proximate to pole tip 182 and thereby further increase the magnitude of the magnetic field that can be conducted therethrough, a throat portion 222 having sides 223 that are tapered from the ABS 216 of pole tip 182 toward back gap 190 at an angle α relative to ABS 216, as shown in FIG. 6. Angle α is less than 90 degrees and preferably in the range of 75–85 degrees. The tapered sides 223 increase a width of the writing pole proximate the pole tip 182. The taper of throat portion 222 can be defined using etching, milling or other processing technique. This results in an improvement over conventional prior art writing poles, whose throat portions are typically formed square to the ABS of the writing pole tip.

Figure 7:
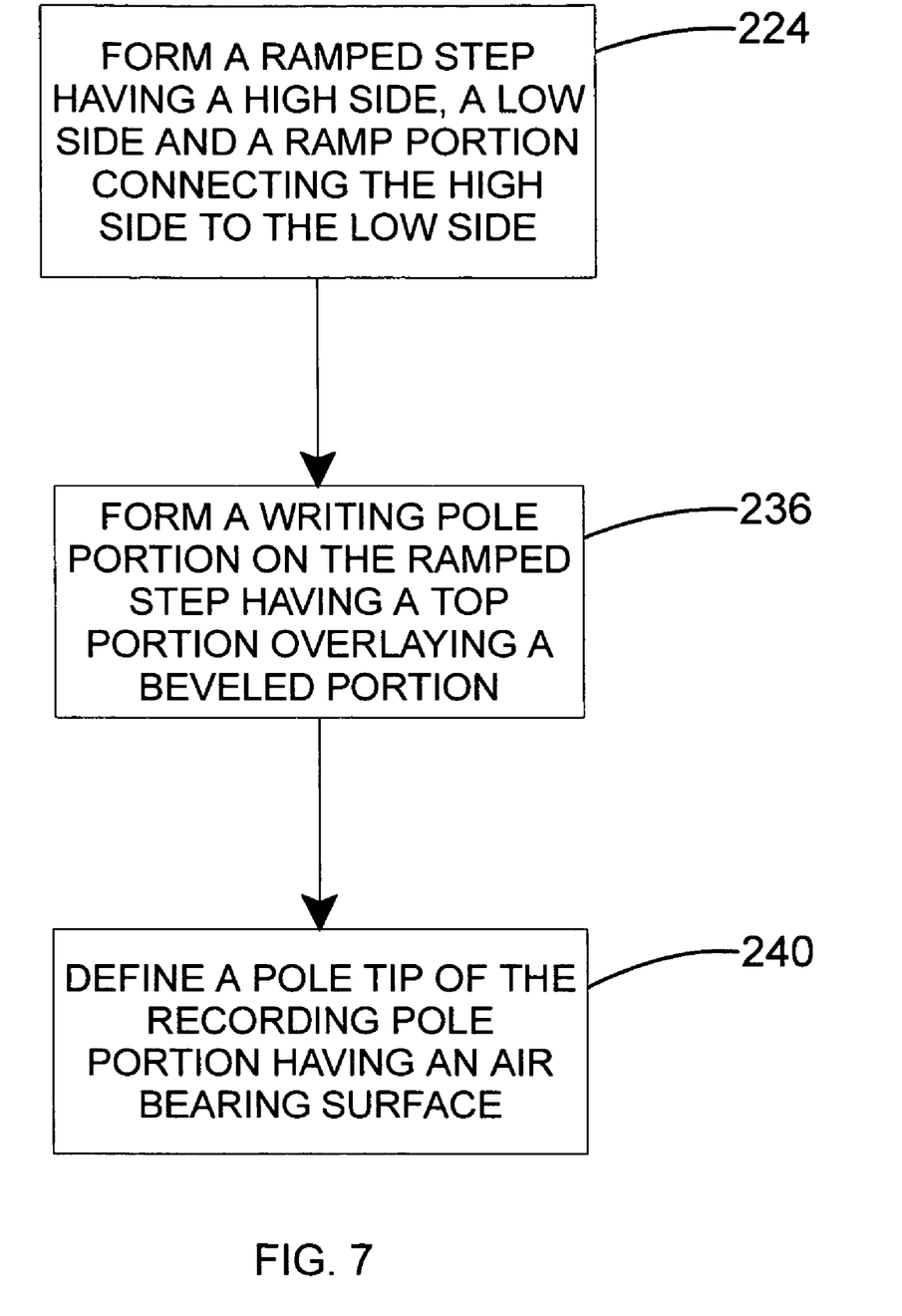
FIG. 7 is a flow chart illustrating a method of forming a beveled writing pole of a perpendicular writing element in accordance with an embodiment of the invention.
Figure 8:
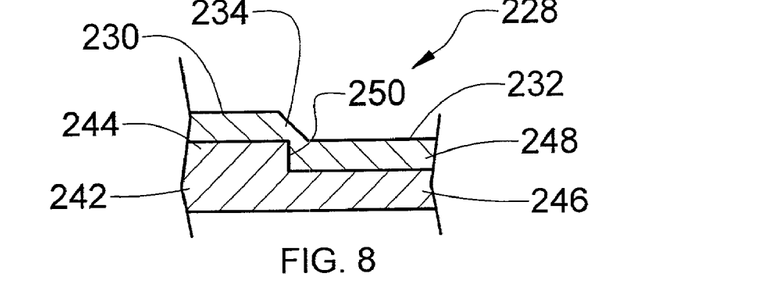
FIG. 8 is a partial side cross-sectional view of a ramped step, which further illustrates a method of forming the ramped step in accordance with an embodiment of the invention.

FIG. 7 is a flowchart illustrating a method of the present invention to form beveled writing pole 180 of writing element 190. At step 224 a ramped step 228 is formed having a high side 230, a low side 232 and a ramp portion 234 connecting the high side to the low side, as shown in FIG. 8. Ramped step 228 is preferably formed of the insulating material 196 (FIG. 4), which is used to insulate writing and return poles 180 and 188 from conductive coil 186, and can be aluminum oxide ($Al_2O_3$) or silicon nitride ($Si_3N_4$) or other suitable insulating material. Next at step 236, a writing pole portion is formed on the ramped step 228 having the top portion 208 overlaying the beveled portion 210 (FIG. 4). Finally, pole tip 182 of the top portion 208 is defined at step 240. A more detailed discussion of the method of the present invention will be discussed in greater detail with reference to FIGS. 8, 9.1–9.3, 10.1–10.3 and 11.1–11.5.

In accordance with one embodiment of step 224 of the method, a vertical step 242 is formed having first and second sides 244 and 246 as shown in FIG. 8. Next, a layer of insulating material 248 is deposited over vertical step 242 to form the ramped step 228. Layer 248 is preferably deposited by sputter deposition in accordance with known methods. The high and low sides 230 and 232 of ramped step 228 respectively correspond to first and second sides 244 and 246 of vertical step 242. An edge 250 of vertical step 242 separates the first and second sides 244 and 246 and is preferably formed substantially vertical, but can be angled toward either first side 244 or second side 246. Ramp portion 234 connects high side 230 to low side 232 and ultimately will define bevel 220 of beveled writing pole 180. Ramp portion 234 is formed as a result of natural faceting that takes place during the deposition of material over edge 250 of vertical step 242.

Figure 91:
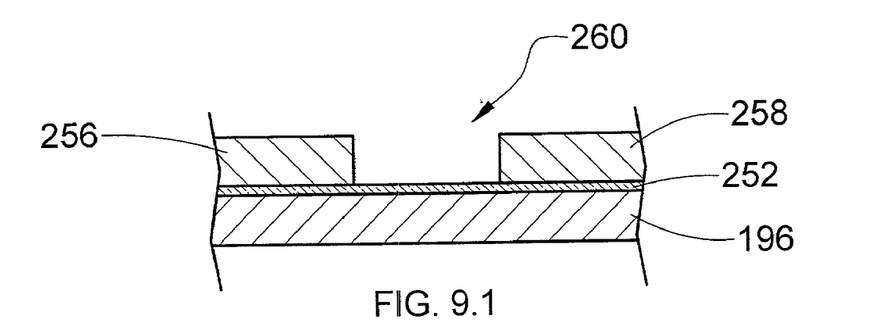
Figure 92:
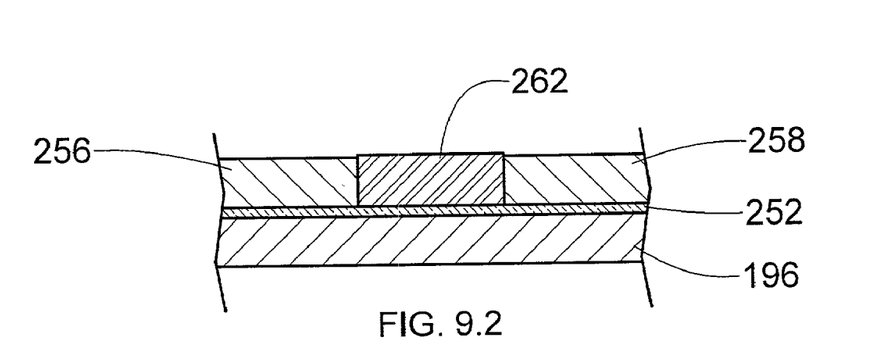
Figure 93:
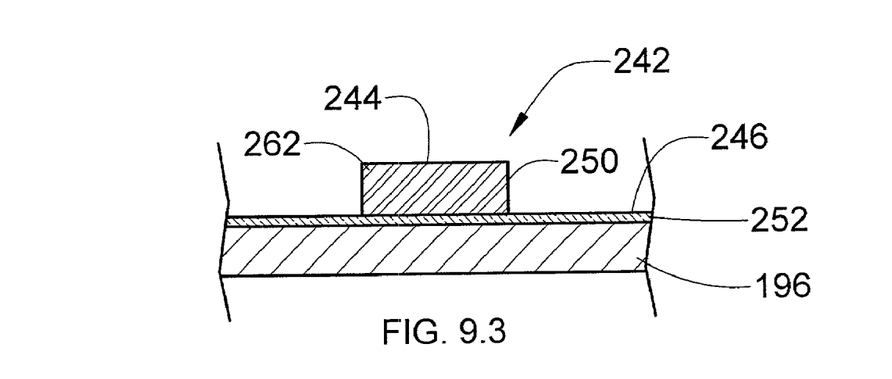

Vertical step 242 can be formed in many different ways using, for example, conventional thin film processing techniques such as photolithography, etching, milling, and lapping techniques. In accordance with one embodiment of the invention, a conductive layer 252 is initially deposited upon insulating material 196, as shown in FIG. 9.1. Conductive layer 252 can be copper (Cu) or other suitable conductive material. Next, photoresist dams 256 and 258 are formed on conductive layer 252 to thereby form a trench 260. A conductive material, such as copper, is then plated within the trench on the exposed conductive layer 252 to form a step member 262, as shown in FIG. 9.2. Finally, photoresist dams 256 and 258 are removed to expose step member 262 and form vertical step 242, as shown in FIG. 9.3. If desired, the exposed conductive layer 252 at second side 246 of vertical step 242 can be removed using a conventional milling process.

Figure 101:
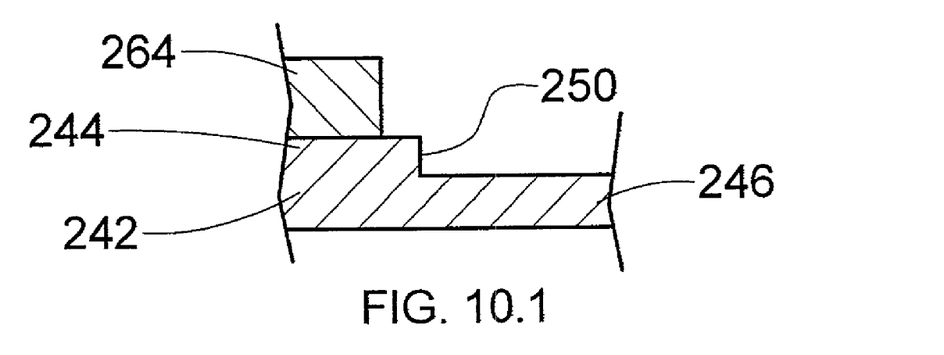
Figure 102:
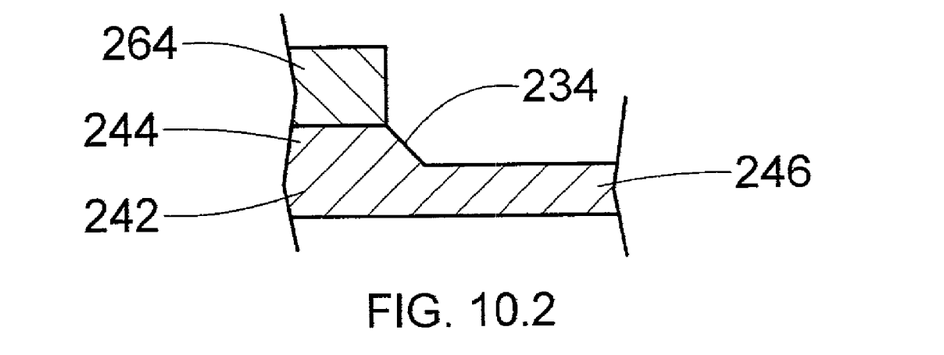
Figure 103:
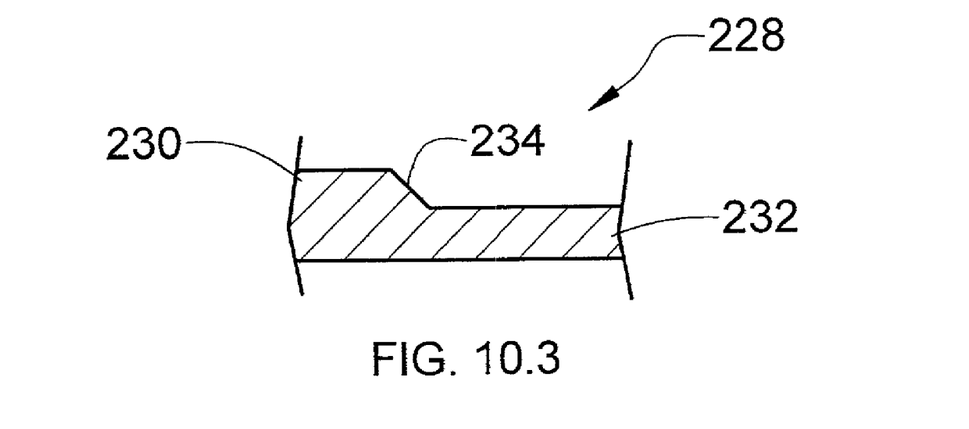

An alternative method of forming ramped step 228 is illustrated in FIGS. 10.1–10.3. Initially, a lift-off mask 264 is formed on first side 244 of vertical step 242 and displaced from the edge 250. Next, exposed portions of first and second sides 244 and 246 of vertical step 242 are milled downwardly to form the ramp portion 234, as shown in FIG. 10.2. Finally, lift-off mask 224 can be removed to expose the ramped step 228, as shown in FIG. 10.3.

FIGS. 11.1–11.5 illustrate steps that can be performed to complete steps 236 and 240 of the method and form the writing pole portion in accordance with various embodiments of the invention. Initially, a first magnetic layer 266 is deposited or formed over the high and low sides 230 and 232 of ramped step 228 in accordance with known methods, such as sputter deposition. First magnetic layer 266 is then polished down to approximately the high side 230 of ramped step 228 to reduce first magnetic later 266 and form beveled portion 210. This step also forms a flat planar surface 270. Next, a second magnetic layer 272 is deposited over the flat surface 270, of the beveled portion 210 and high side 230 of ramped step 228 to form the top portion 208 thereby forming a writing pole portion 273 and completing step 236 of the method. First and second magnetic layers 266 and 272 are preferably formed of cobalt-iron (CoFe), cobalt-nickel-iron (CoNiFe), nickel-iron (NiFe), cobalt (Co), or other suitable magnetic conductive material. Subsequently, pole tip 182 can be defined by horizontally lapping ramped step 228 from high side 230 toward low side 232 to approximately a wedge point 274 of beveled portion 210 to complete step 240 of the method and the formation of beveled writing pole 180.

Figure 112:
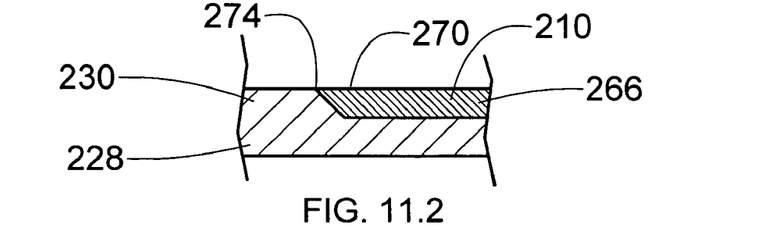

In accordance with another embodiment of the invention, following the step of forming beveled portion 210 as illustrated in FIG. 11.2, ramped step 228 can be horizontally lapped from high side 230 toward low side 232 past wedge point 274 of beveled portion 210 to define top portion 208 and pole tip 182 to simultaneously complete steps 236 and 240 of the method and form beveled writing pole 180.

Figure 111:
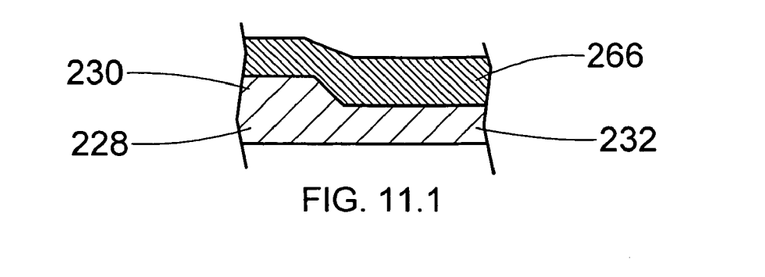
Figure 113:
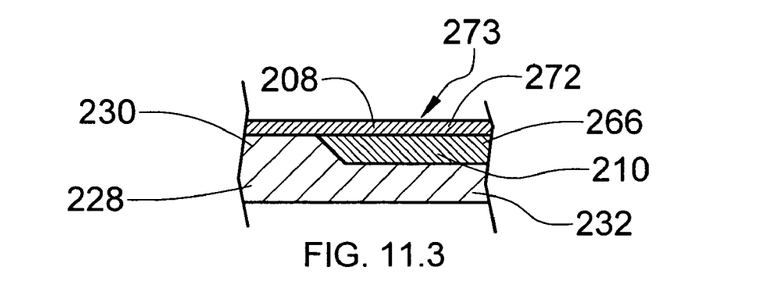
Figure 114:
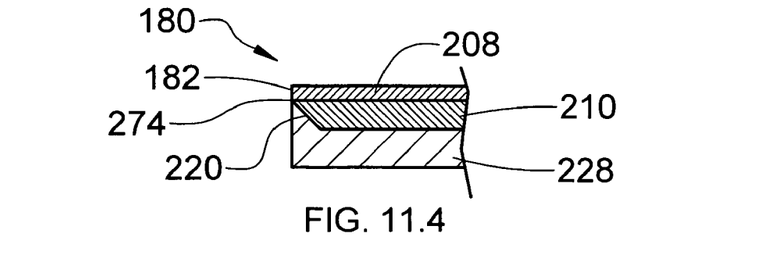
Figure 115:
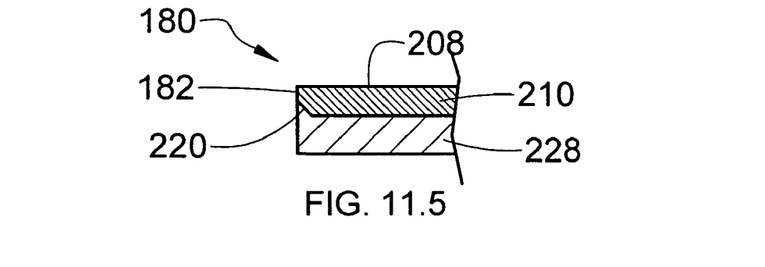

In yet another embodiment of the invention, once first magnetic layer 266 is formed on ramped step 228 (FIG. 11.1), first magnetic layer 266 can be polished down toward first side 244 only a short distance so as to define top portion 208 and beveled portion 210 and form the writing pole portion 273 substantially as shown in FIG. 11.3. Consequently, this embodiment of the method eliminates the need to apply second magnetic layer 272.

In summary, the present invention is directed to a method of forming a beveled writing pole of a perpendicular writing element. Initially, a ramped step (such as 228) is formed (such as at step 224) having a high side (such as 230), a low side (such as 232), and a ramp portion (234) connecting the high side to the low side. Next a writing pole portion (such as 238) is formed on the ramped step (such as at step 236) having a top portion (such as 208) overlaying a beveled portion (such as 210). Finally, a pole tip (such as 182) of the writing pole portion is defined (such as at step 240). The pole tip includes an air bearing surface (such as 216) and a thickness (such as 218) corresponding to a thickness of the top portion.

In accordance with one embodiment, the ramped step is formed by first forming a vertical step (such as 242) having first and second sides (such as 244 and 246) respectively corresponding to the high and low sides of the ramped step. Next, a layer of material (such as 248) is deposited over the vertical step to form the ramped step.

In accordance with another embodiment, the ramped step is formed by initially forming the vertical step and a lift-off mask (such as 264) on the first side. Finally, the second side of the vertical step and exposed portions of the first side milled to form the ramp portion and complete the formation of the ramped step.

In yet another embodiment of the invention, the ramped step is formed by initially forming a conductive layer (such as 252) on an insulating material (such as 196). Next, a trench (such as 260) is formed on the conductive layer with photoresist dams (such as 256 and 258) whereby a portion of the conductive layer within the trench is exposed. A conductive material is plated within the trench on the exposed conductive layer to form a step member (such as 262). The photoresist dams are then removed to expose the step member, which forms the first side of the vertical step, and a material (such as 248) is deposited over the vertical step to form the ramped step. The conductive layer that is not covered by the step member could be removed prior to depositing the material over the vertical step if desired.

In accordance with another embodiment of the invention, the writing pole portion is formed by initially depositing a first magnetic layer (such as 266) over the high side, the low side and the ramp portion of the ramped step. Next, the first magnetic layer is polished down to approximately the high side of the ramped step to form the beveled portion. Subsequently, a second magnetic layer (such as 272) is deposited over the beveled portion and the high side of the ramped step to form the top portion and complete the formation of the writing pole portion.

In accordance with another embodiment, the writing pole portion is formed by depositing the first magnetic layer over the high and low sides of the ramped step and then polishing the first magnetic layer down short of the high side to form the top portion.

In accordance with yet another embodiment of forming the writing pole portion, the first magnetic layer is deposited over the high and low sides of the ramped step and polished down to approximately the high side of the ramped step to form the beveled pole portion. Subsequently, the ramped step and a wedge point (such as 274) of the beveled portion are trimmed from the high side to the low side to define the top portion and complete the formation of the writing pole portion.

In accordance with another embodiment of the invention, the pole tip of the writing pole portion is defined by trimming the ramped step and the writing pole portion from the high side to the low side to substantially a wedge point of the beveled portion.

Additional embodiments of the invention are directed to beveled writing pole that includes a top portion (such as 208), a beveled portion (such as 210), and a throat portion (such as 222). The top portion has an end (such as 212) that defines a writing pole tip (such as 182). The beveled portion adjoins the top portion and has a bevel (such as 220) that extends from the writing pole tip and increases a thickness of the writing pole proximate the pole tip. The throat portion is formed of the top and beveled portions and has tapered sides (such as 223) that extend from the writing pole tip and increase a width of the writing pole proximate the writing pole tip.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of sequence of method steps, structure and arrangement of parts within the principles of the present invention to the full extent indicated by the broad general meaning of the terms in which the appended claims are expressed. For example, the particular steps of the methods may vary depending on the particular application for the beveled writing pole while maintaining substantially the same functionality without departing from the scope and spirit of the present invention.

What is claimed is:

1. A method of forming a beveled writing pole of a perpendicular writing element comprising steps of:
   (a) forming a ramped step having a high side, a low side, and a ramp portion connecting the high side to the low side;
   (b) forming a writing pole portion on the ramped step having a top portion overlaying a beveled portion; and
   (c) defining a pole tip of the writing pole portion having an air bearing surface and a thickness substantially corresponding to a thickness of the top portion, wherein the beveled portion increases a thickness of the writing pole portion measured in a direction that is substantially parallel to the air bearing surface and in a plane that is perpendicular to the air bearing surface and extends through the top portion and the beveled portion.

2. The method of claim 1, wherein the forming step (a) includes:
- (a)(1) forming a vertical step having first and second sides respectively corresponding to the high and low sides of the ramped step; and
- (a)(2) depositing a layer of material over the vertical step to form the ramped step.

3. The method of claim 1, wherein the forming step (a) includes:
- (a)(1) forming a vertical step having first and second sides respectively corresponding to the high and low sides of the ramped step;
- (a)(2) forming a lift-off mask on the first side; and
- (a)(3) milling the second side and exposed portions of the first side of the vertical step to form the ramp portion.

4. The method of claim 1, wherein the forming step (a) includes:
- (a)(1) forming a conductive layer on an insulating material;
- (a)(2) forming a trench on the conductive layer with photoresist dams whereby a portion of the conductive layer within the trench is exposed;
- (a)(3) plating a conductive material within the trench on the exposed conductive layer to form a step member;
- (a)(4) removing the photoresist dams to expose the step member and form a vertical step; and
- (a)(5) depositing a material over the vertical step to form the ramped step.

5. The method of claim 4, including a step of removing the conductive layer that is not covered by the step member prior to performing the depositing step (a)(5).

6. The method of claim 1, wherein the forming step (b) includes:
- (b)(1) depositing a first magnetic layer over the high side, the low side, and the ramp portion of the ramped step;
- (b)(2) polishing the first magnetic layer down to approximately the high side of the ramped step to form the beveled portion; and
- (b)(3) depositing a second magnetic layer over the beveled portion and the high side of the ramped step to form the top portion.

7. The method of claim 1, wherein the forming step (b) includes:
- (b)(1) depositing a first magnetic layer over the high and low sides of the ramped step; and
- (b)(2) polishing the first magnetic layer down short of the high side to form the top portion.

8. The method of claim 1, wherein the forming step (b) includes:
- (b)(1) depositing a first magnetic layer over the high and low sides of the ramped step;
- (b)(2) polishing the first magnetic layer down to approximately the high side of the ramped step to form the beveled portion; and
- (b)(3) trimming the ramped step and a wedge point of the beveled portion from the high side to the low side to define the top portion.

9. The method of claim 1, wherein the defining step (c) includes removing the writing pole portion that overlays the high side of the ramped step.

10. The method of claim 1, wherein the ramped step is formed of an insulating material and the writing pole portion is formed of a magnetic material.

11. The method of claim 10, wherein:
- the insulating material is aluminum oxide ($Al_2O_3$) or silicon nitride ($Si_3N_4$); and
- the magnetic material is cobalt-iron (CoFe), cobalt-nickel-iron (CoNiFe), nickel-iron (NiFe), or cobalt (Co).

12. The method of claim 1, wherein the forming steps (a)–(c) are performed in accordance with at least one thin film processing technique selected from a group consisting of photolithography, etching, milling, and lapping.

13. The method of claim 1, wherein the thickness and a width of the pole tip are approximately 200 angstroms or less.

14. The method of claim 1, wherein the ramp portion is sloped at an angle of approximately 45 degrees.

15. The method of claim 1, wherein the beveled portion increases the thickness of the writing pole portion from the pole tip.

16. The method of claim 1, wherein the beveled portion increases the thickness of a portion of the writing pole portion with distance from the air bearing surface.

17. A method of forming a writing pole of a perpendicular writing element comprising steps of:
- (a) forming a ramped step having a high side, a low side, and ramp portion connecting the high side to the low side;
- (b) depositing a first magnetic layer over the high side, the low side, and the ramp portion;
- (c) polishing the first magnetic layer down to approximately the high side of the ramped step to form a beveled portion;
- (d) depositing a second magnetic layer over the beveled portion and the high side of the ramped step to form a top portion, the beveled and top portions forming a writing pole portion; and
- (e) defining a pole tip of the writing pole portion, the pole tip having an air bearing surface, a thickness substantially corresponding to a thickness of the writing pole portion and a width.

18. The method of claim 17, wherein the forming step (a) includes:
- (a)(1) forming a vertical step having first and second sides respectively corresponding to the high and low sides of the ramped step; and
- (a)(2) depositing a layer of material over the vertical step to form the ramped step.

19. The method of claim 17, wherein the forming step (a) includes:
- (a)(1) forming a vertical step having first and second sides respectively corresponding to the high and low sides of the ramped step; and
- (a)(2) forming a lift-off mask on the first side; and
- (a)(3) milling the second side and exposed portions of the first side of the vertical step to form the ramp portion.

20. The method of claim 17, wherein the forming step (a) includes:
- (a)(1) forming a conductive layer on an insulating material;
- (a)(2) forming a trench on the conductive layer with photoresist dams whereby a portion of the conductive layer within the trench is exposed;
- (a)(3) plating a conductive material within the trench on the exposed conductive layer to form a step member;
- (a)(4) removing the photoresist dams to expose the step member and form a vertical step; and
- (a)(5) depositing a material over the vertical step to form the ramped step.

21. A method of forming a beveled writing pole of a perpendicular writing element comprising steps of:
  a) forming a vertical step having a first side and a second side;
  b) forming a ramped step using the vertical step, the ramped step having a high side and a low side respectively corresponding to the first side and the second side of the vertical step, and a ramp portion having a top surface extending from a top surface of the high side to a top surface of the low side, wherein the top surface of the ramp portion is non-perpendicular to the top surfaces of the high and low sides; and
  c) forming a writing pole portion on the ramped step having a beveled portion.

22. The method of claim 21, wherein the forming step b) includes steps of:
  forming a lift-off mask on the first side of the vertical step; and
  milling the vertical step to form the ramp portion.

23. The method of claim 22, wherein the milling step includes milling the second side of the vertical step and exposed portions of the first side of the vertical step.

24. The method of claim 21 including defining a pole tip of the writing pole portion having an air bearing surface.

25. The method of claim 21, wherein the forming step c) includes forming a top portion overlaying the beveled portion.

26. The method of claim 25 including defining a pole tip of the writing pole portion having an air bearing surface and a thickness substantially corresponding to a thickness of the top portion.

27. The method of claim 26, wherein the forming step c) includes trimming the ramped step and the writing pole portion from the high side to the low side to substantially a wedge point of the beveled portion.

28. The method of claim 21, wherein the forming step a) includes:
  forming a conductive layer on an insulating material;
  forming a trench on the conductive layer with photoresist dams whereby a portion of the conductive layer within the trench is exposed;
  plating a conductive material within the trench on the exposed conductive layer to form a step member; and
  removing the photoresist dams to expose the step member and form the vertical step.

29. The method of claim 28 including depositing a material over the vertical step to form the ramped step.

30. The method of claim 21, wherein the forming step b) includes depositing a layer of material over the vertical step.

31. The method of claim 21, wherein the ramped step is formed of an insulating material and the writing pole portion is formed of a magnetic material.

* * * * *